United States Patent
Shima et al.

(10) Patent No.: US 8,488,504 B2
(45) Date of Patent: Jul. 16, 2013

(54) POWER SAVING CONTROL FOR NETWORK SYSTEM

(75) Inventors: Toshihiro Shima, Shiojiri (JP); Susumu Shiohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 13/011,673

(22) Filed: Jan. 21, 2011

(65) Prior Publication Data

US 2011/0182208 A1 Jul. 28, 2011

(30) Foreign Application Priority Data

Jan. 26, 2010 (JP) ................................. 2010-014185

(51) Int. Cl.
*H04J 1/16* (2006.01)
*H04L 12/56* (2006.01)

(52) U.S. Cl.
USPC ............ 370/311; 370/252; 370/419; 370/463

(58) Field of Classification Search
USPC .................. 370/252, 311, 419, 463
See application file for complete search history.

(56) References Cited

U.S. PATENT DOCUMENTS

| 5,724,591 | A  | * | 3/1998  | Hara et al. ............... 713/322 |
| 8,155,052 | B2 | * | 4/2012  | Gonzalez-Velazquez .... 370/321 |
| 2002/0161740 | A1 | | 10/2002 | Nakamura et al. |
| 2008/0144086 | A1 | | 6/2008 | Shibao |

FOREIGN PATENT DOCUMENTS

| CN | 101207671 A | 6/2008 |
| JP | 10-049267 | 2/1998 |
| JP | 2000-339116 | 12/2000 |
| WO | 01-07355 | 10/2001 |
| WO | 01-73558 | 10/2001 |

* cited by examiner

*Primary Examiner* — John Pezzlo
(74) *Attorney, Agent, or Firm* — Maschoff Brennan

(57) ABSTRACT

A network system including a plurality of devices connected to one another via a network includes a grouping processing section configured to, from among the plurality of devices, perform grouping of devices having at least one predetermined item common thereto in terms of device usage, and a representative selection section configured to select one of the devices having been grouped as a representative device. Further, the network system includes a control section configured to cause non-representative devices, which are remaining devices resulting from excluding the representative device from the devices having been grouped, to perform synchronously a mode switching operation for switching between a normal mode and a power saving mode in which an amount of power consumption is smaller than that in the normal mode, and cause the representative device to perform the mode switching operation independently of the mode switching operation performed by the non-representative devices.

11 Claims, 16 Drawing Sheets

FIG. 7

| DEVICE ID | USER ID | AFFILIATION | INSTALLATION PLACE | LOGIN TIME | GROUPING |
|---|---|---|---|---|---|
| Pr1 | 0001 | G1 | Room1 | 9:20 | TARGET |
| Pr2 | 0001 | G1 | Room1 | 9:21 | TARGET |
| Pr3 | 0001 | G1 | Room1 | 9:22 | TARGET |
| Pr4 | 0002 | G2 | Room2 | 11:20 | OUT OF TARGET |

POWER SAVING CONTROL FOR NETWORK SYSTEM

BACKGROUND

1. Technical Field

The present invention relates to power saving control for a network system including a plurality of devices connected to one another via a network.

2. Related Art

Control associated with power saving of a device has been known from a viewpoint of reducing power consumption. If the device is not used for a specific period of time under a normal operation condition (hereinafter referred to as "a normal mode"), the operation condition of the device is moved to a condition in which an amount of power consumption is smaller than that in the normal mode (hereinafter referred to as "a power saving mode"). Further, if a predetermined operation or input of information is performed under the power saving mode, the operation condition of the device is returned to the normal mode. In this specification, an operation for switching operation conditions of a device, that is, an operation for switching between the normal mode and the power saving mode of a device, is referred to as "a mode switching operation", and control associated with switching of the operation modes of a device is referred to as power saving control. In addition, the power saving mode is also referred to as an energy saving mode or a standby mode.

A technology for controlling in a coordinated manner a plurality of devices included in a network system and connected to one another via a network has been known (for example, refer to JP-A-10-49267).

In addition, International Publication No. 01/73558 and JP-A-2000-339116 are examples of related art.

In the case where a plurality of devices connected to one another via a network are used by users, power saving control is performed independently for each of the devices. Accordingly, a device which has not been used by the users for a specific period of time independently moves to a power saving mode even though not desired by the users. Therefore, there is a possibility of increasing user convenience with respect to power saving control in a network system including a plurality of devices connected to one another via a network.

In the case where all the devices connected to one another via a network have moved to a power saving mode at a time, a user who desires to use any one of the devices afterward needs to wait until completion of switching from the power saving mode to a normal mode of the device. In this case also, with respect to power saving control in a network system including a plurality of devices connected to one another via a network, there is a possibility of increasing user convenience.

SUMMARY

An advantage of some aspects of the invention is to increase user convenience of a network system including a plurality of devices connected to one another via a network.

The invention can be realized as applied examples or embodiments described below.

Applied Example 1

A network system according to an applied example 1 of the invention, which has a plurality of devices connected to one another via a network, includes a grouping processing section configured to, from among the plurality of devices, perform grouping of devices having at least one predetermined item common thereto in terms of device usage, a representative selection section configured to select one of the devices having been grouped as a representative device, and a control section configured to cause non-representative devices, which are remaining devices resulting from excluding the representative device from the devices having been grouped, to perform synchronously a mode switching operation for switching between a normal mode and a power saving mode in which an amount of power consumption is smaller than that in the normal mode and cause the representative device to perform the mode switching operation independently of the mode switching operation performed by the non-representative devices.

In this network system, from among the plurality of devices, devices having at least one predetermined item common thereto in terms of device usage are grouped, and one of the devices having been grouped is selected as the representative device. For the non-representative devices, the mode switching operation for switching between the normal mode and the power saving mode is performed synchronously, and for the representative device, the mode switching operation is performed independently of the mode switching operation performed by the non-representative devices. Therefore, in this network system, it is possible to suppress each of the devices having been grouped from moving to the power saving mode independently and allow the representative device to continue operations in the normal mode even after the non-representative devices have moved to the power saving mode. Thus, it is possible to increase user convenience.

Applied Example 2

In the network system according to the applied example 1, preferably, the representative selection section selects as the representative device a device for which a period of time taken from a time, at which the mode switching operation for switching from the power saving mode to the normal mode is performed, to the start of a predetermined operation is the longest of the devices having been grouped.

In this network system, it is possible to cause a device, for which a period of time taken from the time at which the mode switching operation for switching from the power saving mode to the normal mode is performed to the start of a predetermined operation is the longest of the devices having been grouped, not to move to the power saving mode but to continue operations in the normal mode. Further, it is possible to cause each of the other devices, for which the period of time is relatively short, to move to the power saving mode. Thus, it is possible to increase user convenience as the whole of the network system.

Applied Example 3

In the network system according to the applied example 1, preferably, the representative selection section selects a device which has moved latest to the power saving mode among the devices having been grouped, as the representative device.

In this network system, in the case where the representative device is used after the non-representative devices have moved to the power saving mode, it is possible to improve efficiency of processing performed by the representative device.

Applied Example 4

In the network system according to the applied example 1, preferably, the representative selection section selects the representative device so that, among the devices having been grouped, a frequency of being selected as the representative device can be averaged for each of the devices having been grouped.

In this network system, the devices in the group may be equally consumed and wear.

Applied Example 5

In the network system according to the applied example 1, preferably, the control section causes the representative device to operate in the normal mode during a period of time the non-representative devices are in the power saving mode.

In this network system, it is possible to promptly use the representative device even during the period of time the non-representative devices are in the power saving mode. Thus, it is possible to further increase user convenience.

Applied Example 6

In the network system according to the applied example 1, preferably, the devices having been grouped are printing apparatuses, and once a printing job is inputted to one of the non-representative devices, the representative device acquires the printing job from the non-representative device, and performs one of operations of executing the printing job and retaining the printing job until completion of switching of the non-representative device to the normal mode.

In this network system, even a printing apparatus that is one of the non-representative devices is in the power saving mode, printing jobs can be issued as desired, and further, if possible, the printing jobs can be executed by the printing apparatus that is the representative device. Thus, it is possible to further increase user convenience.

Applied Example 7

In the network system according to the applied example 1, preferably, the devices having been grouped are computers, and upon acquisition of a password for the mode switching operation for switching from the power saving mode to the normal mode, the representative device transmits the password to the non-representative devices, and the non-representative devices perform the mode switching operation for switching from the power saving mode to the normal mode by using the password having been transmitted thereto.

In this network system, it is possible to allow computers to move to the normal mode without causing users to input a password to each of the computers forming a group. Thus, it is possible to further increase user convenience.

Applied Example 8

In the network system according to the applied example 1, preferably, the predetermined item in terms of device usage is at least one of a user, a usage place, a usage time, and an attribute of a user.

In this network system, it is possible to increase user convenience in the case where devices having at least one of items common thereto, the items being a user, a usage place, a usage time and an attribute of a user, are grouped to be controlled on a group basis.

Applied Example 9

In the network system according to the applied example 1, preferably, the grouping processing section, the representative selection section, and the control section are included in the devices having been grouped.

In this network system, even in the case where the grouping processing section, the representative selection section and the control section are included in the device, it is possible to increase user convenience of the network system.

The invention can be realized with various aspects, such as a network system, a network apparatus, a network device, a control method for the network system, the network apparatus or the network device, a computer program for realizing functions based on the network system, the network apparatus, the network device or the control method, a recording medium storing the computer program therein, and a data signal including the computer program and being superimposed onto a carrier wave.

BRIEF DESCRIPTION OF THE DRAWINGS

The invention will be described with reference to the accompanying drawings, wherein like numbers reference like elements.

FIG. 7 is an explanatory diagram illustrating an example of login user information.

DESCRIPTION OF EXEMPLARY EMBODIMENTS

Embodiments according to the invention will be hereinafter described on the basis of respective examples in the following order.
A. First Example:
  A-1. Configuration
  A-2. Grouping processing:
  A-3. Synchronized power saving control processing:
B. Second Example:
C. Third Example:
D. Modified Examples:

A. First Example

Figure 1:
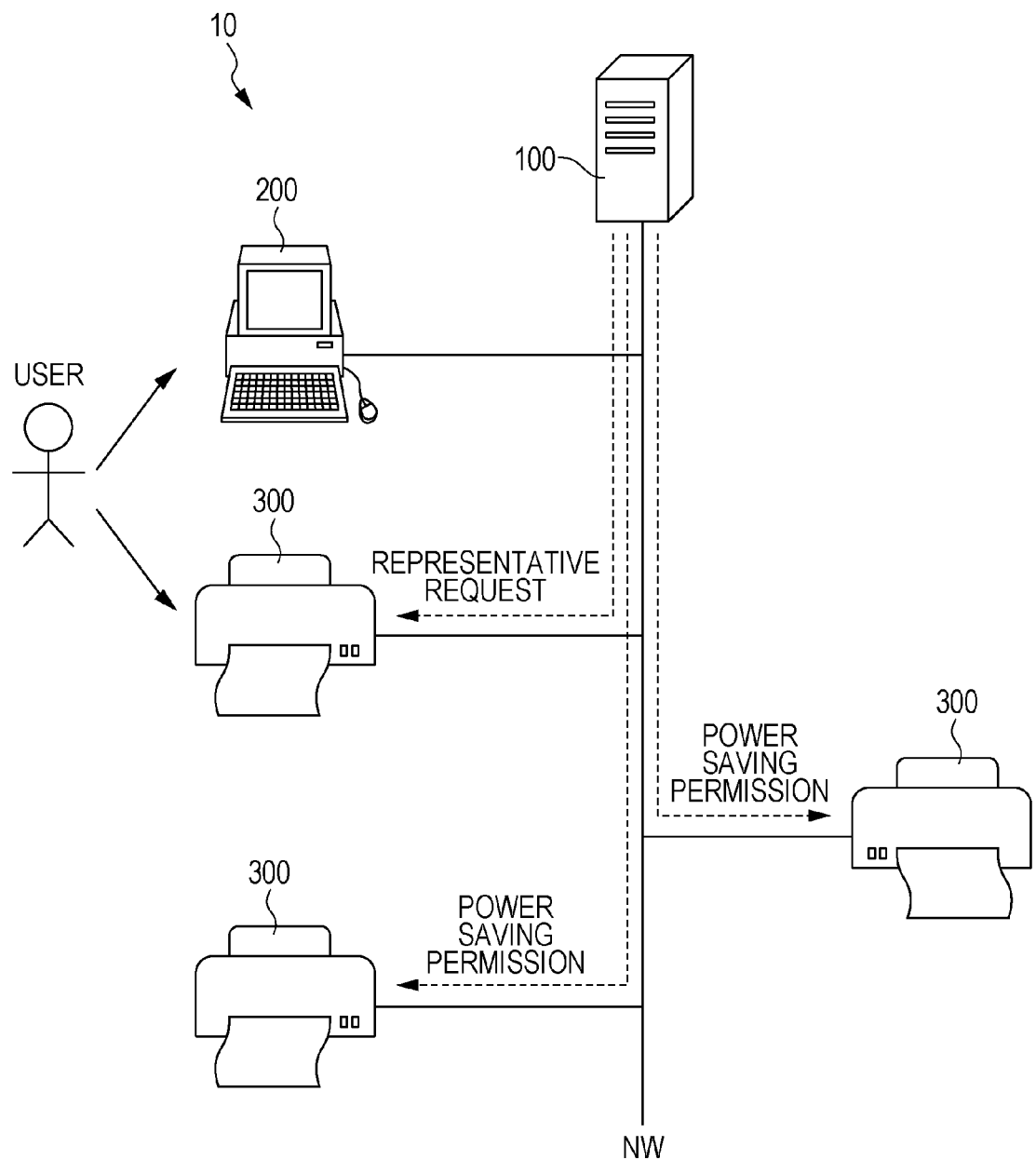
FIG. 1 is an explanatory diagram illustrating a configuration of a network system according to a first example of the invention.

A-1. Configuration: FIG. 1 is an explanatory diagram illustrating a configuration of a network system 10 according to a first example of the invention. The network system 10 in this example is configured to include a server 100, a client computer 200 (hereinafter referred to as "a client 200") and a plurality of printers 300. The server 100, the client 200, and each of the printers 300 are connected to one another via a network NW, such as a LAN. In the network system 10, it is possible for users to perform printing using each of the printers 300 by operating, for example, the client 200. Other network-connectable devices such as other client computers, scanners, projectors or facsimile machines may be connected to the network NW. Further, in this example, the network NW is a wired network as shown in FIG. 1, but may be a wireless network.

The network system 10 includes a security system, and a security management is performed by the server 100 collectively. Specifically, when a user uses the client 200 and the printer 300, the user performs processing of inputting a user ID and a password to the client 200 and the printer 300 (hereinafter, this processing will be referred to as "login processing"), and the user ID and the password (hereinafter, these will be referred to as "login information") are transmitted to the server 100, which performs the security management using the login information.

Figure 2:
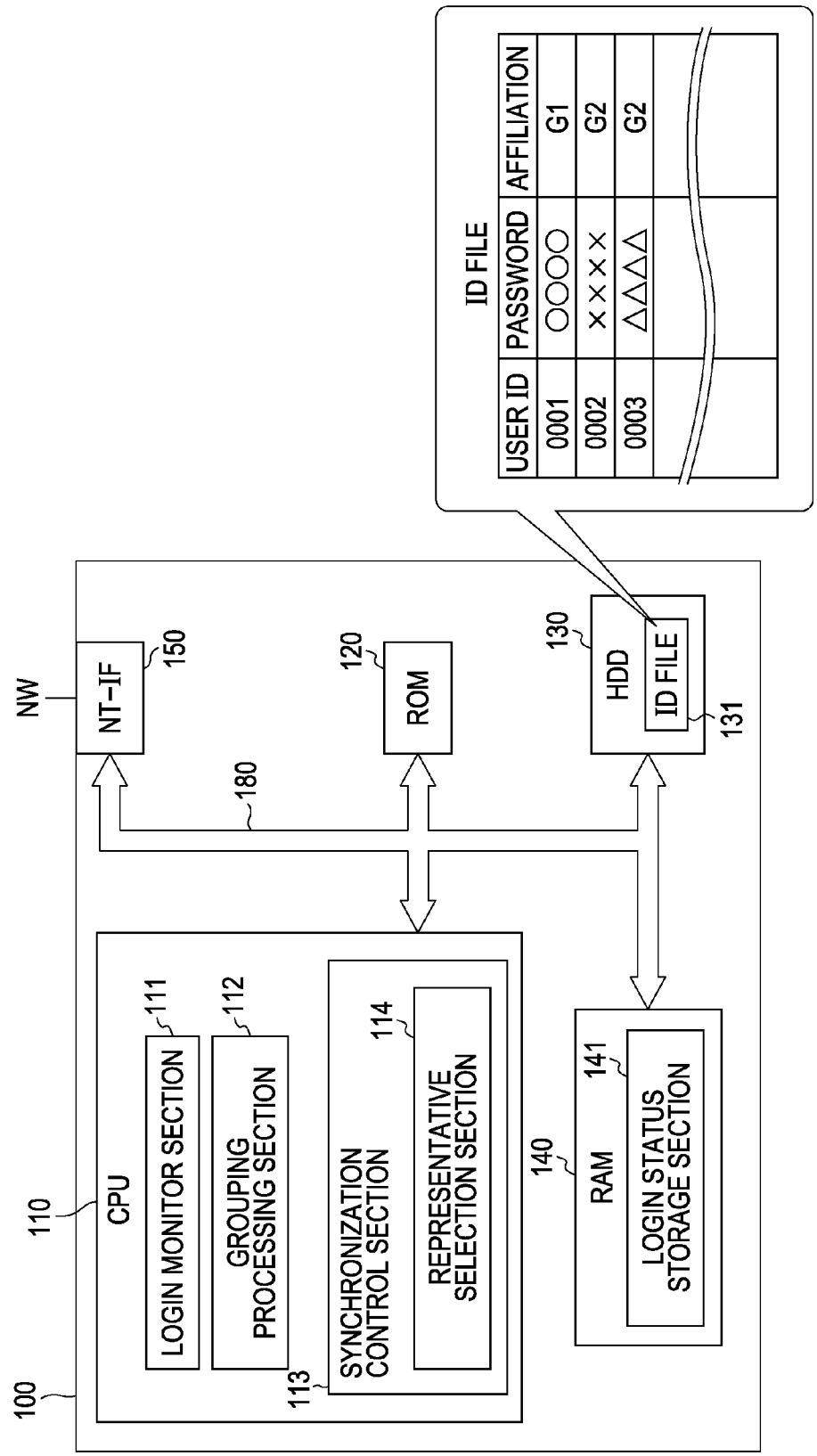
FIG. 2 is an explanatory diagram illustrating an outline of a configuration of a server according to the first example of the invention.

FIG. 2 is an explanatory diagram illustrating an outline of a configuration of the server 100. The server 100 is configured to include a CPU 110, a ROM 120, a hard disc drive (hereinafter referred to as "HDD") 130, a RAM 140 and a network interface (hereinafter referred to as "NT-IF") 150, and these components are connected to one another via a bus 180. The server 100 is connected to the network NW via the NT-IF 150, and transmits various data and information to and receives such data and information from other devices included in the network system 10.

The ROM 120 stores therein BIOS programs necessary for activating the server 100. The CPU 110 is configured to, when the server 100 is activated, access the ROM 120 to execute the BIOS programs. Along with executing the BIOS programs, an operating system (hereinafter, this will be referred to as "a server OS"), which is stored in a predetermined track of the HDD 130, is loaded onto the RAM 140, and the server OS is executed by the CPU 110. With respect to the server OS, a server OS, such as Linux®, Solaris®, NetWare® or Windows NT/2000®, can be used. Further, a dedicated server for login authentication processing may be separately provided.

The CPU 110 is configured to include a login monitor section 111, a grouping processing section 112 and a synchronization control section 113. The synchronization control section 113 is configured to include a representative selection section 114. The CPU 110 realizes functions of these sections by retrieving and executing programs (not shown) stored in the HDD 130. Details of functions of these sections will be described below.

The HDD 130 is a storage device for storing data and information therein. The HDD 130 stores therein the above-described server OS and programs, as well as an ID file 131, in which user information associated with users using the network system 10, such as user IDs, passwords and affiliations, is recorded.

The RAM 140 constitutes a main memory that is used by the CPU 110. The CPU 110 loads necessary programs onto this main memory and executes the loaded programs. Further, the RAM 140 includes a login status storage section 141. The login status storage section 141 stores therein login user information, such as user IDs, IP addresses, login times and login locations associated with devices and users, for which respective logins have been authorized by the login monitor section 111. The login status storage section 141 also stores therein information relating to devices that have been grouped (hereinafter referred to as "grouping information") by the grouping processing section 112.

Figure 3:
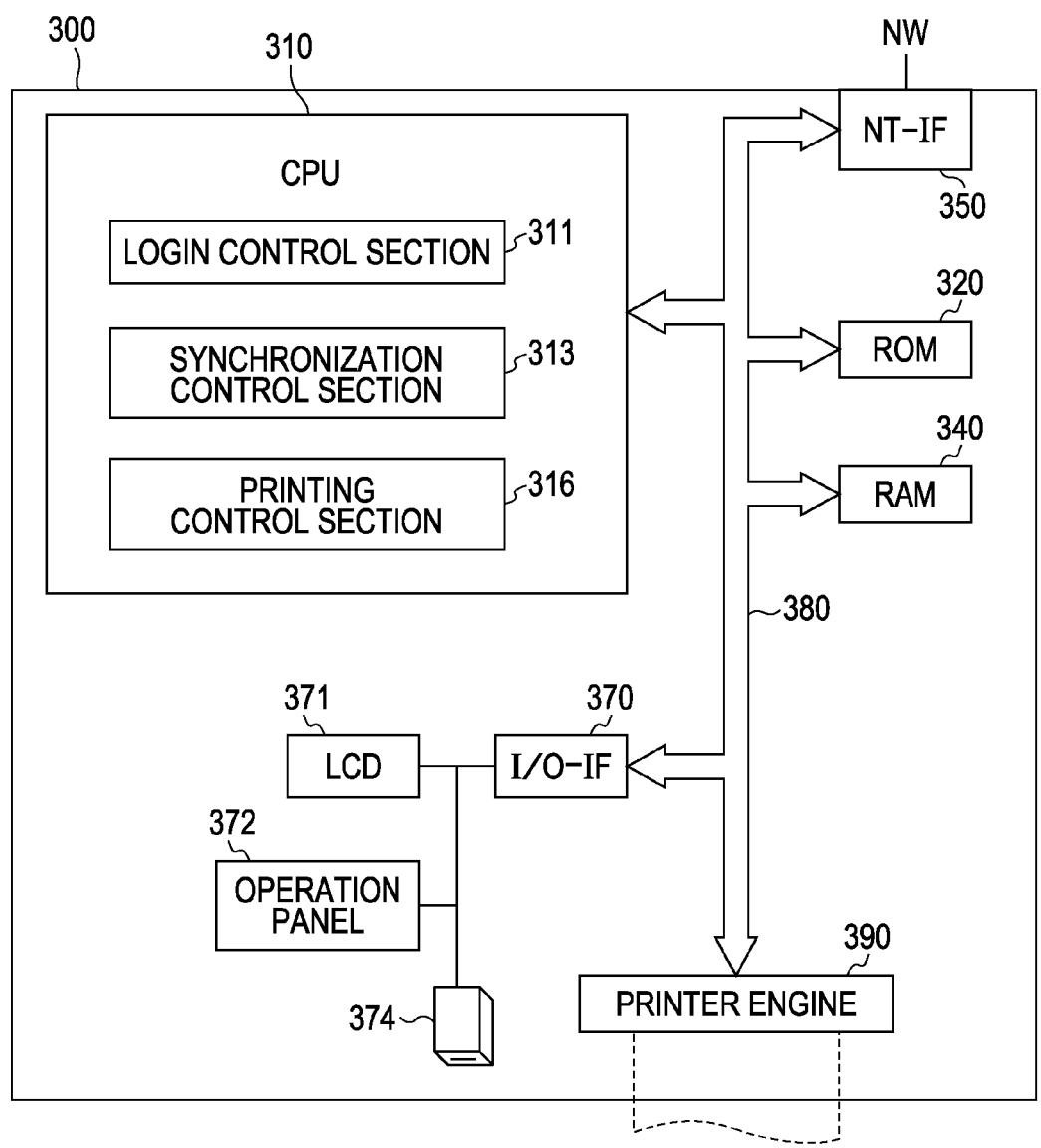
FIG. 3 is an explanatory diagram illustrating an outline of a configuration of a printer according to the first example of the invention.

FIG. 3 is an explanatory diagram illustrating an outline of a configuration of the printer 300. The printer 300 is configured to include a CPU 310, a ROM 320, a RAM 340, a network interface (NT-IF) 350, an external input/output interface (hereinafter referred to as "I/O-IF") 370 and a printer engine 390, and these components are connected to one another via a bus 380. The printer 300 is connected to the network NW via the NT-IF 350, and transmits various data and information to and receives such data and information from other devices inside the network system 10.

The ROM 320 stores therein control programs for controlling overall operations performed by the printer 300. The CPU 310 is configured to include a login control section 311, a synchronization control section 313 and a printing control section 316. The CPU 310 realizes functions of these sections by retrieving and executing programs stored in the ROM 320 and the RAM 340.

The printing control section 316 acquires printing data transmitted from devices (for example, the client 200) that are connected to the printer 300 via the network NW, as well as devices that are directly connected to the printer 300, and performs control so as to cause the printer engine 390 to execute printing on the basis of the printing data, and the size of a sheet of printing paper which is designated by a user via an operation panel 372. The printer engine 390 is a mechanism for executing printing in accordance with control performed by the printing control section 316.

A liquid crystal display (LCD) 371, the operation panel 372 and an ID card reader 374 are connected to the I/O-IF 370. The liquid crystal display panel 371 displays thereon a menu screen, images and the like. The operation panel 372 includes operation buttons (not shown) thereon, which are used for operations performed by users. A user inputs a user ID to the printer 300 by inserting an ID card into the ID card reader 374. Further, the user inputs a password to the printer 300 using the operation panel 372.

Figure 4:
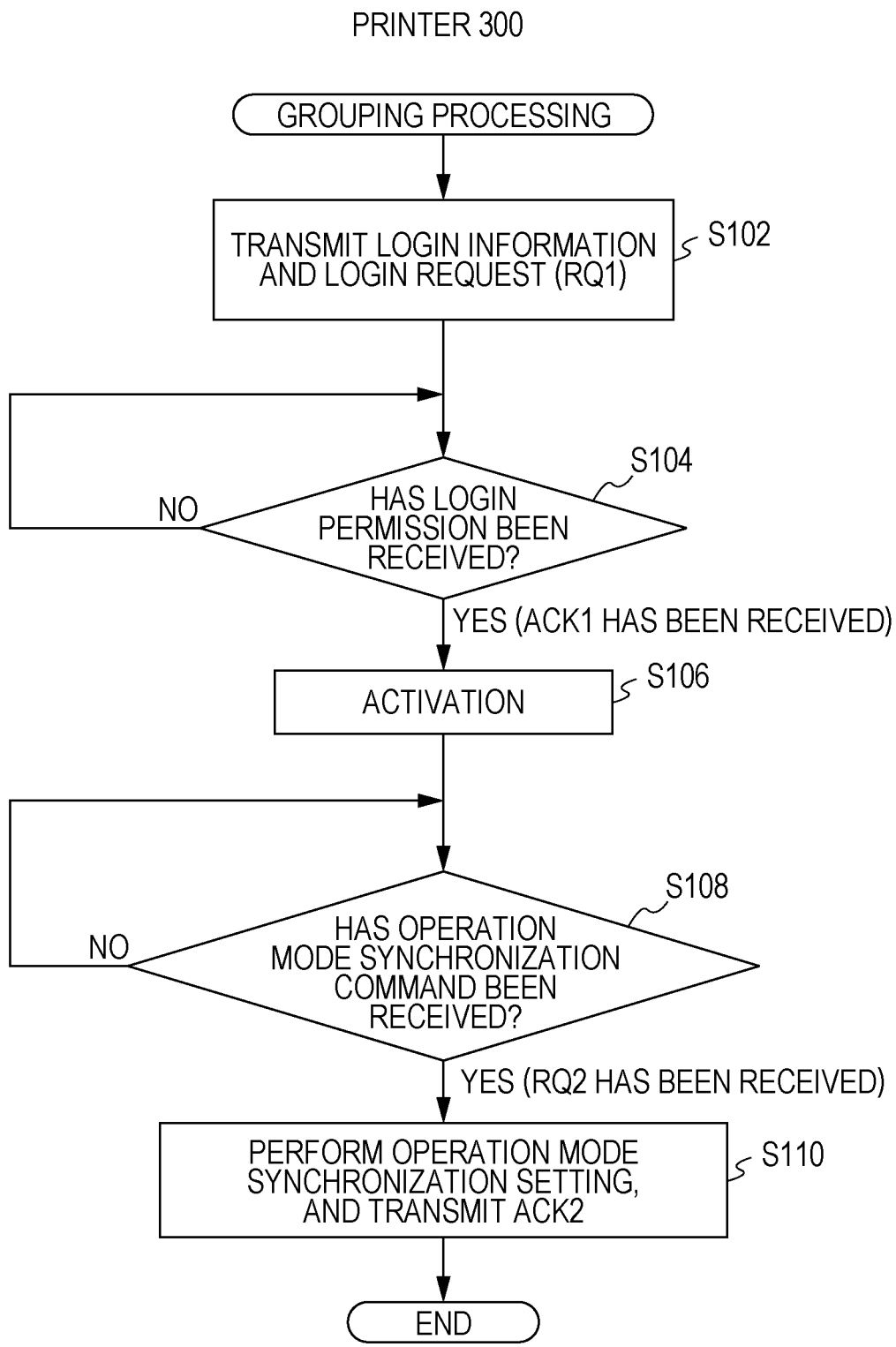
FIG. 4 is a flowchart illustrating a flow of grouping processing according to the first example of the invention.
Figure 5:
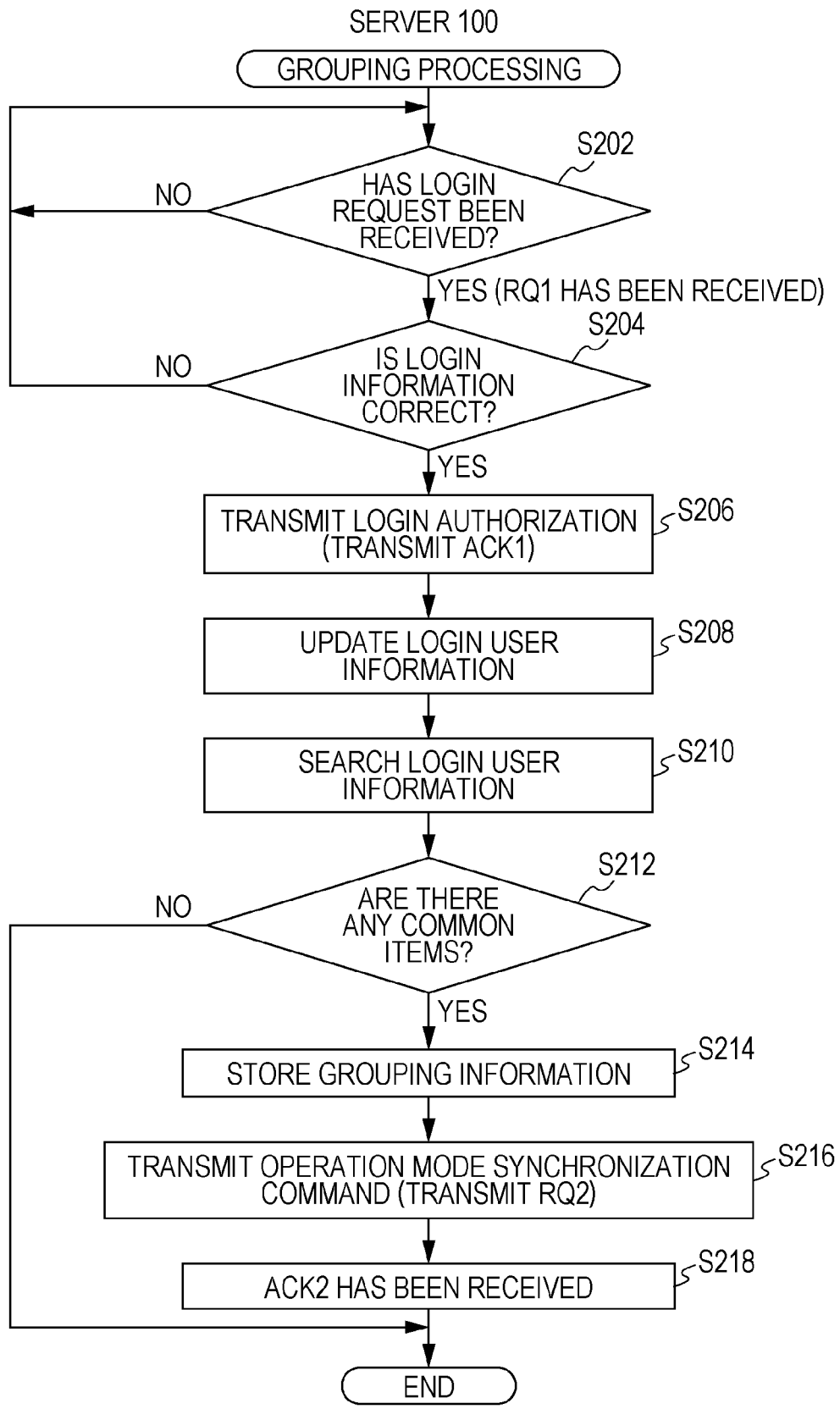
FIG. 5 is a flowchart illustrating a flow of grouping processing according to the first example of the invention.
Figure 6:
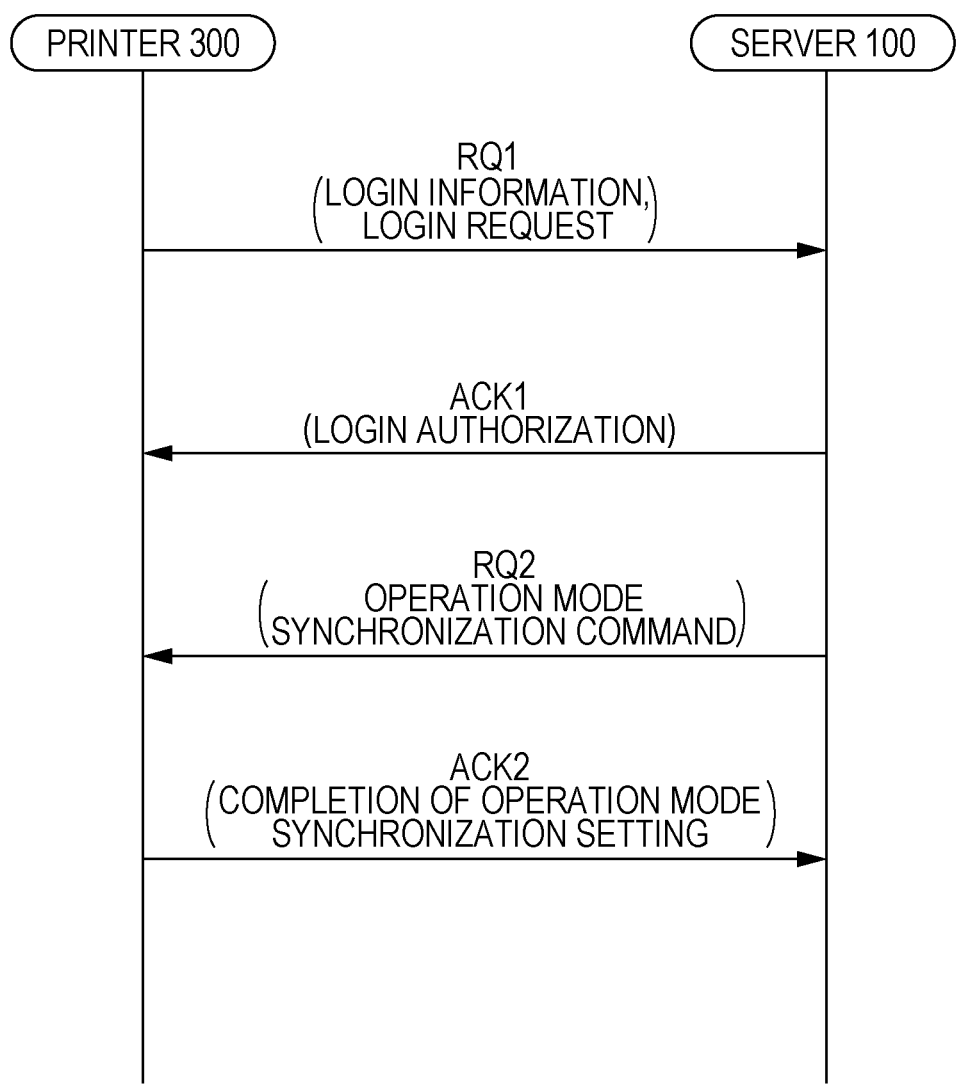
FIG. 6 is a chart illustrating information transmitted and received between a printer and a server, according to the first example of the invention.

A-2. Grouping processing: FIGS. 4 and 5 are flowcharts each illustrating a flow of grouping processing. The grouping processing is processing for grouping a plurality of devices, which have predetermined items common thereto in terms of device usage. The plurality of devices having been grouped in the network system 10 are subjected to synchronized power saving control processing, which will be described below. In this example, under control performed by the server 100, the printers 300 is subjected to the grouping processing. FIG. 4 is a flowchart illustrating the processing performed by the printer 300 in the grouping processing. FIG. 5 is a flowchart illustrating the processing performed by the server 100 in the grouping processing. Further, FIG. 6 is a chart illustrating transmissions and receptions of information, which are performed between the printer 300 and the server 100 in the grouping processing.

When a user uses the printer 300, the user inputs a user ID by inserting an ID card into the ID card reader 374 of the printer 300. Further, the user inputs a password by using the operation panel 372. The login control section 311 transmits the user login information having been inputted (i.e., the user ID and the password) and a login request to the server 100 (step S102 of FIG. 4, and RQ1 of FIG. 6). Subsequently, the login control section 311 monitors a receipt of a login authorization (step S104).

The login monitor section 111 of the server 100 monitors a receipt of login information and a login request (step S202 of FIG. 5). Upon receipt of login information and a login request having been transmitted from the printer 300 (YES in step S202), the login monitor section 111 verifies the received login information with user information recorded in the ID file 131 of the HDD 130 (step S204). As a result of the verification, if it is determined that the login information is correct, the login monitor section 111 transmits a login authorization ACK1 to the printer 300 that has transmitted the login information (step S206, and ACK1 of FIG. 6). As a result of the verification, if it is determined that the login information is incorrect, the login monitor section 111 transmits a request for retrying input of user information to the printer 300.

Upon receipt of the login authorization ACK1 (YES in step S104 of FIG. 4), the login control section 311 of the printer 300 logs in on the network system 10 and activates the printing control section 316 and the printer engine 390 (step S106). A device having logged in on the network system 10 is referred to as a logged-in device. Subsequently, the synchronization control section 313 monitors a receipt of an operation mode synchronization command (step S108).

Subsequent to transmission of the login authorization ACK1, the login monitor section 111 of the server 100 updates login user information, which is recorded in the login status storage section 141 (FIG. 2) inside the RAM 140 (step S208 of FIG. 5). FIG. 7 is an explanatory diagram illustrating an example of login user information. As shown in FIG. 7, the login information includes a user ID and an installation place (a usage place) for identifying a user, as well as information for identifying a login time (a use start time) and the like, for each of the devices included in the network system 10. The login monitor section 111 identifies a device, which has made a request for a login, in accordance with a device ID thereof, and updates a user ID, a login time and the like within login information corresponding to the identified device.

Further, the grouping processing section 112 of the server 100 searches entire login user information for logged-in devices having any items common to one another with respect to items such as a user ID, a login time and an installation place (step S210). In the case where, for example, there is not a device having any items common to one another because, prior to receipt of a login from the printer 300 on which a login operation has been performed by a user, any other devices than the logged-in printer 300 have not logged in (NO in step S212), the grouping processing in the server 100 is terminated.

As a result of searching login user information, if there are any devices having items common to one another (YES in step S212), the grouping processing section 112 of the server 100 accesses the login status storage section 141, and adds to the login user information (FIG. 7) grouping information which indicates that devices each having items common to one another form a group (step S214). Thus, it is possible to identify devices grouped by referring to the login user information. For example, in an example shown in FIG. 7, three printers 300 (Pr1, Pr2 and Pr3), which are used by the same user and installed at the same place, are grouped.

The synchronization control section 113 of the server 100 transmits an operation mode synchronization command RQ2 to devices having been grouped (step S216, and RQ2 of FIG. 6).

Upon receipt of the operation mode synchronization command RQ2 from the server 100 (YES in step S108 of FIG. 4), the synchronization control section 313 of each of the printers 300 having been grouped performs operation mode synchronization setting in which control associated with switching of operation modes of the printer 300 (power saving control) is synchronized with control associated with that of the other devices within the group. Subsequently, each synchronization control section 313 transmits an ACK2, which indicates completion of operation mode synchronization setting, to the server 100 (step S110, and ACK2 of FIG. 6). The grouping processing section 112 of the server 100 receives the ACK2, which indicates completion of the operation mode synchronization setting, from the printer 300 (step S218 of FIG. 5). By performing the processes described above, the grouping processing has been completed.

In this example, when grouping a plurality of logged-in devices, devices satisfying three conditions, i.e., the same user, an approximate overlapping of login times and the same installation place (usage place) are grouped. However, a plurality of logged-in devices may be grouped using a single condition, that is, the same user or the same installation place.

Figure 8:
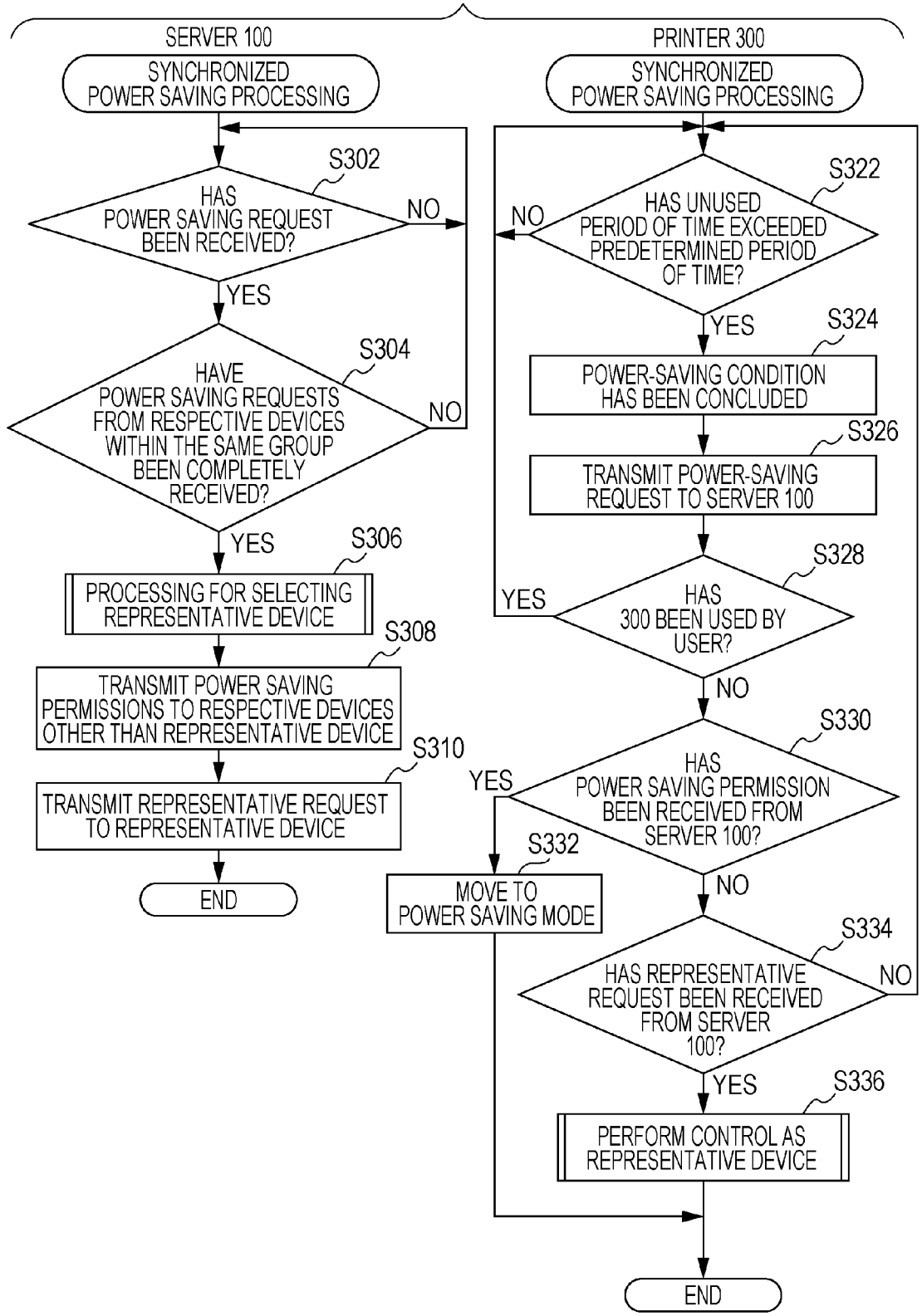
FIG. 8 is a flowchart illustrating a flow of synchronized power saving control processing in a network system according to the first example of the invention.

A-3. Synchronized power saving control processing: FIG. 8 is a flowchart illustrating a flow of synchronized power saving control processing performed in the network system 10. The synchronized power saving control processing is a process in which a control operation associated with switching of operation modes (power saving control) is performed on each of a plurality of devices having been grouped in the network system 10. The switching is synchronized with switching of operation modes for the other devices of the plurality of devices included in the group. Hereinafter, synchronized power saving control processing under the following condition will be described. Specifically, a plurality of the printers 300 have been grouped in the network system 10 by executing grouping processing, and each of the printers 300 is operating in a normal mode. In the right area of FIG. 8, processing performed by the printer 300 in the synchronized power saving control processing is shown, and in the left area of FIG. 8, processing performed by the server 100 in the synchronized power saving control processing is shown.

The synchronization control section 313 (FIG. 3) of the printer 300 measures an elapsed time from the time when a user used the printer 300 last time (hereinafter, the elapsed time will be referred to as "a unused period of time"), and monitors whether the unused period of time has exceeded a predetermined period of time (a threshold value), or not (step S322 of FIG. 8). Here, "using a device" means causing a device to perform some processing. Specifically, in the printer 300, some processing corresponds to receiving a printing processing command from the client 200, printing processing or the like, and in the client 200, some processing corresponds to input operations using a keyboard 272, operating a mouse 273, reading from a disc using an optical disc drive 260. The threshold value for measuring the unused period of time is set on each device in advance.

If the unused period of time has exceeded a predetermined period of time (YES in step S322), the synchronization control section 313 of the printer 300 determines that a power saving condition has been concluded (step S324), and transmits a power saving request to the server 100 (step S326). After having transmitted the power saving request, the synchronization control section 313 monitors whether usage by a user has been detected or not (step S328), and if any usage by a user has been detected, the synchronization control section 313 cancels the conclusion of the power saving condition, and causes the process flow to return to the determination process relating to the unused period of time (step S322). In addition, at this time, the synchronization control section 313 transmits a command for cancelling the power saving request to the server 100.

The synchronization control section 313 of the printer 300 does not yet perform switching of operation modes to a power saving mode, but monitors a receipt of a power saving permission from the server 100 or a receipt of a representative request from the server 100 (steps S330 and S334), which will be described below. After having transmitted the power saving request to the server 100 (step S326), upon receipt of the power saving permission from the server 100 under the condition that the printer 300 remains unused by users (YES in step S330), the synchronization control section 313 performs switching of operation mode to the power saving mode, in which an amount of power consumption is smaller than that in the normal mode (step S332). After having transmitted the power saving request to the server 100, upon receipt of the representative request from the server 100 under the condition that the printer 300 remains unused by users (YES in step S334), the synchronization control section 313 performs control as a representative device (step S336), which will be described below.

The synchronization control section 113 of the server 100 monitors a receipt of a power saving request (step S302). Upon receipt of the power saving request from any one of the printers 300, the synchronization control section 113 identifies each of the other printers 300 forming the group including the printer 300 that has transmitted the power saving request by referring to information included in the login status storage section 141, and determines whether power saving requests have already been received from all the identified other printers 300, or not (step S304). If the power saving requests from all the other printers 300 have not yet been received (NO in step S304), the process flow returns to monitoring of a receipt of a power saving request (step S302). If a command for canceling a power saving request has been transmitted from one of the printers 300, from which a power saving request has already been received, the power saving request from the relevant printer 300 is canceled.

Figure 9:
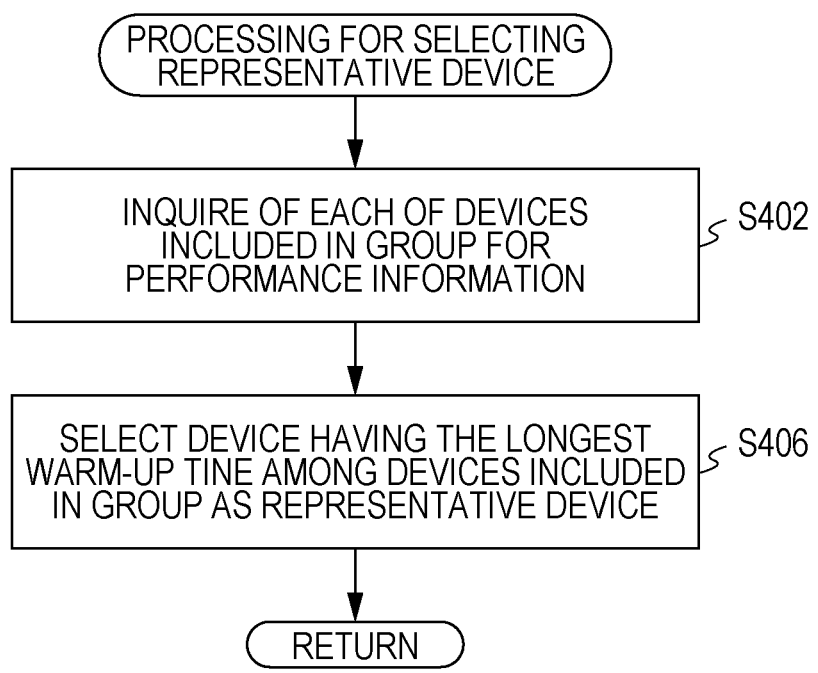
FIG. 9 is a flowchart illustrating a flow of representative device selection processing according to the first example of the invention.

If power saving requests from all the printers 300 forming a group have been received (YES in step S304), the synchronization control section 113 of the server 100 selects a representative device (a representative printer) from among all the printers 300 (step S306). FIG. 9 is a flowchart illustrating a flow of representative device selection processing. The synchronization control section 113 of the server 100 inquires of each of the printers 300 forming a group for performance information thereof (step S402), and selects as a representative device one of the printers 300 having the longest warm-up time which is identified from the performance information (step S406). The warm-up time is a period of time taken from a time at which a power saving mode has been switched to a normal mode to a time at which the printer 300 becomes ready for starting predetermined operations (printing operations in the case of the printer 300). A reason for selecting a representative device in such a manner will be described below.

Upon completion of selecting a representative device, the synchronization control section 113 of the server 100 transmits a power saving permission to each of the printers 300 other than the representative device, among a plurality of the printers 300 having been grouped (step S308 of FIG. 8). The printers 300 other than the representative device, among a plurality of the printers 300 having been grouped, are referred to as non-representative devices (non-representative printers). The transmitted power saving permission is received by each of the printers 300 that are the non-representative devices (step S330), and each of the printers 300 having received the power saving permission moves to the power saving mode synchronously (step S332).

The synchronization control section 113 of the server 100 transmits a representative request to the printer 300 functioning as the representative device (hereinafter also referred to as "a representative printer 300R") (step S310). The transmitted representative request is received by the representative printer 300R (step S334), and the representative printer 300R having received the representative request starts control as a representative device (step S336).

Figure 10:
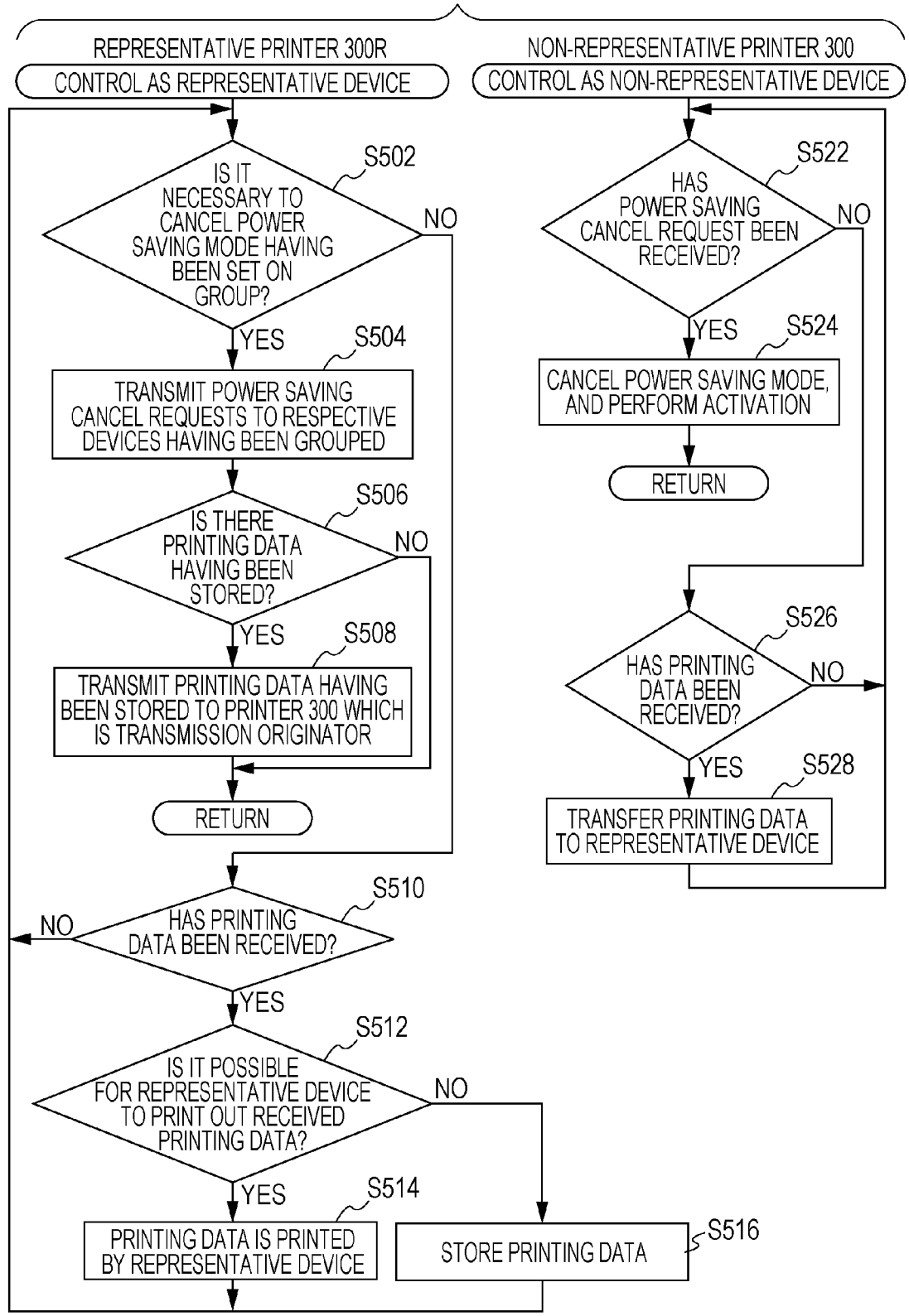
FIG. 10 is a flowchart illustrating a flow of synchronized power saving control processing performed by a non-representative device after the non-representative device has moved to a power saving mode, according to the first example of the invention.

FIG. 10 is a flowchart illustrating a flow of synchronized power saving control processing after the non-representative device has moved to a power saving mode. In the left area of FIG. 10, the content of synchronized power saving control processing performed by the representative printer 300R is shown, and in the right area of FIG. 10, the content of synchronized power saving control processing performed by the non-representative printer 300 is shown.

The synchronization control section 313 (FIG. 3) of the non-representative printer 300 monitors a receipt of a power saving cancel request (described below) from the representative printer 300R (step S522), and monitors a receipt of printing data (step S526). If printing data is received by the non-representative printer 300 (YES in step S526), the synchronization control section 313 of the non-representative printer 300 transfers the printing data to the representative printer 300R via the network NW (step S528).

The synchronization control section 313 of the representative printer 300R monitors a receipt of an instruction for cancelling a power saving mode for a group via the operation panel 372 (FIG. 3) and the like (step S502), and monitors a receipt of printing data (step S510). If the printing data is received by the representative printer 300R (YES in step S510), the synchronization control section 313 of the representative printer 300R determines whether the representative printer 300R can perform printing on the basis of the received printing data, or not (step S512). If possible, the synchronization control section 313 causes the printing control section 316 to perform printing processing (step S514), and if not possible, the synchronization control section 313 stores the printing data in a predetermined storage area (step S516).

If the synchronization control section 313 of the representative printer 300R has received the instruction for cancelling a power saving mode for a group (YES in step S502), the synchronization control section 313 transmits a power saving cancel request to each of the non-representative printers 300 within the group (step S504). Upon receipt of the power saving cancel request, each of the non-representative printers 300 cancels the power saving mode and is activated (i.e., moves to the normal mode from the power saving mode) (step S524). In addition, if the representative printer 300R has printing data having been stored therein at the time when transmitting the power saving cancel request (YES in step S506), the representative printer 300R transmits the printing data to the non-representative printer 300 which has transferred the data (step S508). This transmitted printing data is processed by the non-representative printer 300 having moved to the normal mode.

As described above, in the network system 10 of this example, the printers 300 having predetermined items (a user ID, a login time, an installation place and the like) common thereto in terms of device usage are grouped among the printers 300 within the network system 10, and one of the printers 300 having been grouped is selected as the representative printer 300R. Each of the non-representative printers 300 among the printers 300 having been grouped moves to a power saving mode when having received a power saving permission from the server 100 which is issued synchronously while operating in a normal mode, and moves to a normal mode when having received a power saving cancel request from the representative printer 300R which is issued synchronously while operating in the power saving mode. That is, each of the non-representative printers 300 performs a mode switching operation for switching between the normal mode and the power saving mode synchronously. Note that, performing a mode switching operation synchronously is not limited to performing a mode switching operation at the exactly same moment, but includes a case in which each of the non-representative devices, which has received a power saving permission or a power saving cancel request having been transmitted thereto as one of a series of processes, performs a mode switching operation triggered by the receipt of the power saving permission or the power saving cancel request. In contrast, even after each of the non-representative printers 300 has moved to the power saving mode, the representative printer 300R does not move to the power saving mode, but continues operations in the normal mode. That is, the representative printer 300R performs a mode switching operation independently of those performed by the non-representative printers 300. Therefore, in the network system 10 of this example, it is possible to suppress each of the printers 300 having been grouped from moving to a power saving mode independently, and it is possible for users to perform printing by using the representative printer 300R that continues operations even after the non-representative printers 300 among the printers 300 having been grouped have moved to the power saving mode. Thus, in the network system 10 of this example, it is possible to increase user convenience.

Further, in the network system 10 of this example, the printer 300 having the longest warm-up time among the printers 300 forming a group is selected as the representative printer 300R. By employing such a method, it is possible to cause the printer 300 having the longest warm-up time not to move to the power saving mode but to continue operations in the normal mode, and in contrast, cause the other printers 300 each having a relatively short warm-up time to move to the power saving mode. Thus, it is possible to increase user convenience as the whole of the network system 10.

Further, in the network system 10 of this example, when the non-representative printer 300 has received printing data while being in the power saving mode, the non-representative printer 300 transfers the printing data to the representative printer 300R, which performs printing processing on the printing data. Alternatively, if it is difficult for the representative printer 300R to perform printing processing, the printing data is stored in a storage area. Therefore, in the network system 10 of this example, even when each of the non-representative printers 300 is in the power saving mode, the client 200 or the like can issue printing jobs without restriction, and if possible, the printing jobs are executed by the representative printer 300R. Thus, it is possible to further increase user convenience.

B. Second Example

Figure 11:
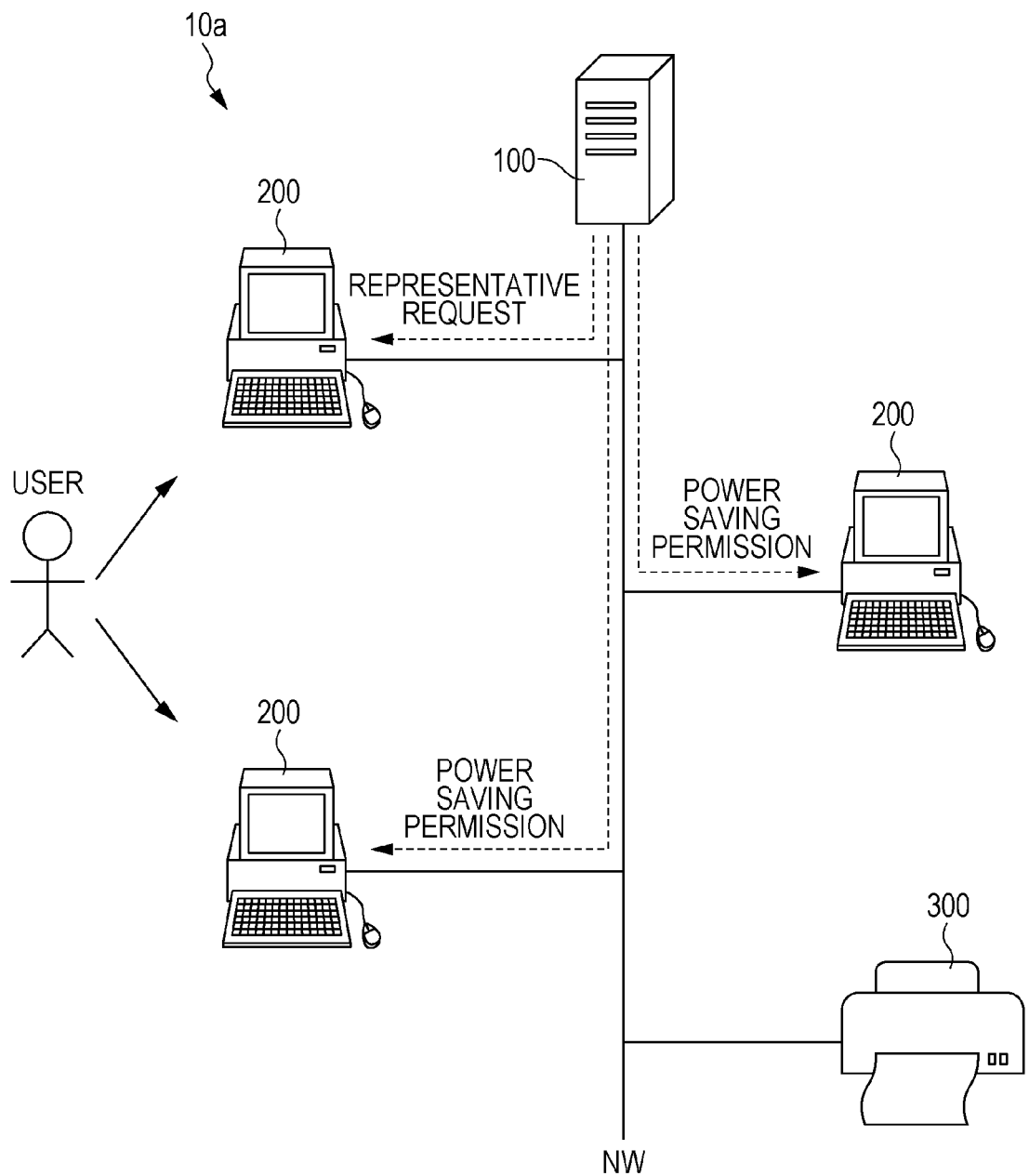
FIG. 11 is an explanatory diagram illustrating a configuration of a network system according to a second example of the invention.

FIG. 11 is a diagram illustrating a configuration of a network system 10a according to a second example. A difference between the network system 10a of the second example and the network system 10 of the first example shown in FIG. 1 is that the network system 10a of the second example includes a plurality of clients 200. In the second example, under control performed by the server 100, grouping processing and synchronized power saving control processing targeted for the clients 200 are performed.

Figure 12:
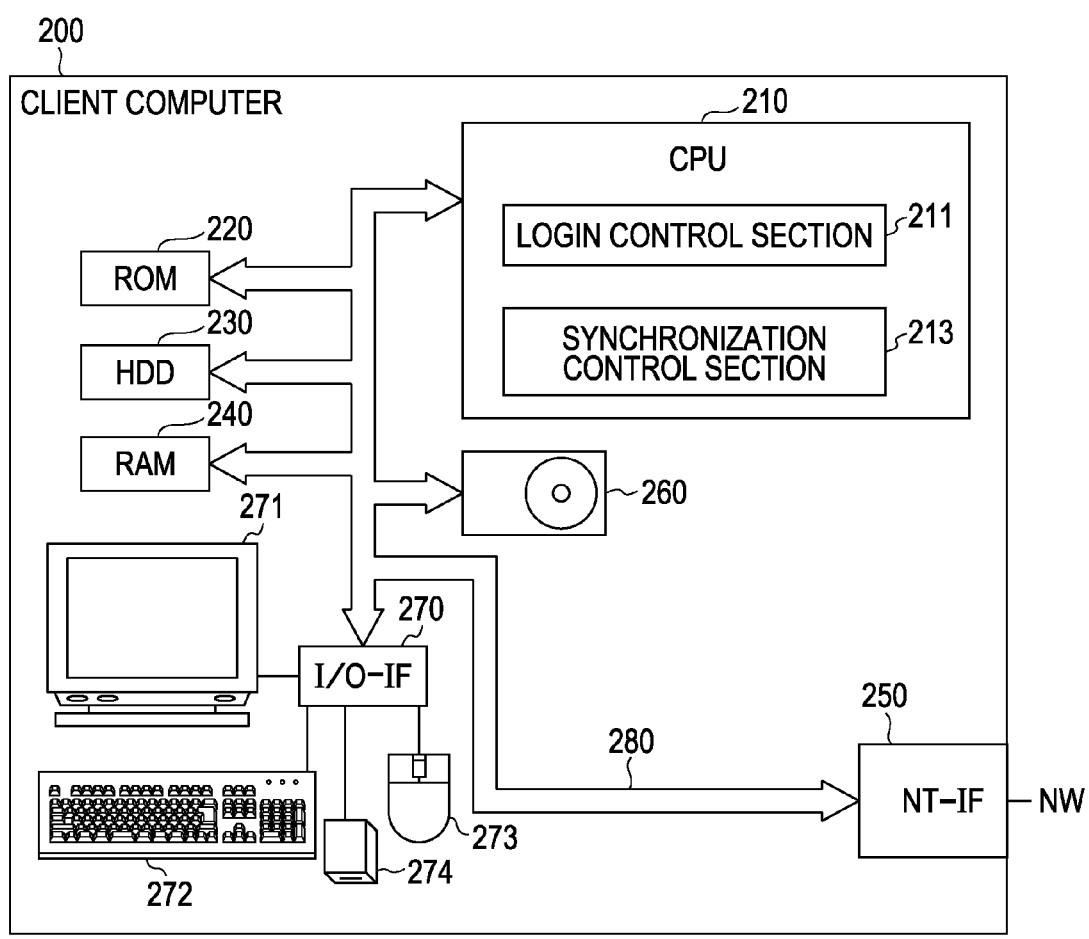
FIG. 12 is an explanatory diagram illustrating an outline of a client computer according to the second example of the invention.

FIG. 12 is an explanatory diagram illustrating an outline of a configuration of the client 200. The client 200 includes a CPU 210, a ROM 220, a hard disc drive (HDD) 230, a RAM 240, a network interface (NT-IF) 250, the optical disc drive 260, and an external input/output interface (I/O-IF) 270, and these components are connected to one another via a bus 280. The client 200 is connected to a network NW via the NT-IF 250, and transmits various data and information to and receives such data and information from other devices inside the network system 10a.

The ROM 220 stores BIOS programs necessary for activating the client 200. The CPU 210 accesses the ROM 220 to execute the BIOS programs when activating the client 200. Along with executing the BIOS programs, an operating system (hereinafter referred to as "OS"), which is stored in a predetermined track of the HDD 230, is loaded onto the RAM 240, and is executed by the CPU 210.

The CPU 210 is configured to include a login control section 211 and a synchronization control section 213. The CPU 210 realizes functions of these sections by retrieving programs (not shown) stored in the HDD 230 to execute the programs. Details of functions of these sections will be described below.

The HDD 230 is a storage device for storing data and information therein, and stores therein the above-described OS and programs, as well as application programs, and files of data users have created by using the application programs.

A display 271, the keyboard 272, the mouse 273, and an ID card reader 274 are connected to the I/O-IF 270. A user inputs a user ID to the client 200 by inserting an ID card into the ID card reader 274. Further, the user inputs a password to the client 200 via the keyboard 272.

Grouping processing in the second example is performed in the same manner as or in a manner similar to the grouping processing in the first example (FIGS. 4 and 5). That is, in the grouping processing of the second example, the clients 200 having predetermined items common thereto in terms of device usage are grouped in the network system 10a (FIG. 11). In the grouping processing of the second example, specifically, once a user inputs a user ID by inserting an ID card into the card reader 274 of the client 200 and inputs a password by using the keyboard 272, the login control section 211 transmits the inputted login information (i.e., the user ID and the password) and a login request to the server 100. Upon receipt of the login information and the login request from the client 200, the login monitor section 111 of the server 100 verifies the login information with user information stored in the ID file 131, and if it is determined that the login information is correct, the login monitor section 111 transmits a login permission to the client 200. Upon receipt of the login permission, the login control section 311 of the client 200 logs in on the network system 10a, and the client 200 is activated. The grouping processing section 112 of the server 100 searches logged-in devices for devices having items common to one another, the items being associated with a user ID, a login time, an installation place and the like. If there are devices having items common to one another, the grouping processing section 112 performs grouping of the devices, and transmits an operation mode synchronization command to the devices having been grouped. Upon receipt of the operation mode synchronization command from the server 100, the synchronization control section 213 of each of the grouped clients 200 performs operation mode synchronization setting.

Synchronized power saving control processing in the second example is also performed in the same manner or in a manner similar to that processing in the first example (FIG. 8). That is, upon receipt of a power saving request from each of the clients 200 included in a group, the synchronization control section 113 of the server 100 selects a representative device (the representative client 200R), transmits a representative request to the representative client 200R, and transmits a power saving permission to each of the clients 200 other than the representative client 200R (i.e., non-representative clients 200). Upon receipt of the power saving permission, each of the non-representative clients 200 moves to a power saving mode. Further, upon receipt of the representative request, the representative client 200R performs control as a representative device. In addition, in the second example, it is assumed that, when each of the clients 200 moves to the normal mode from the power saving mode, a password having been set in advance is necessary.

Figure 13:
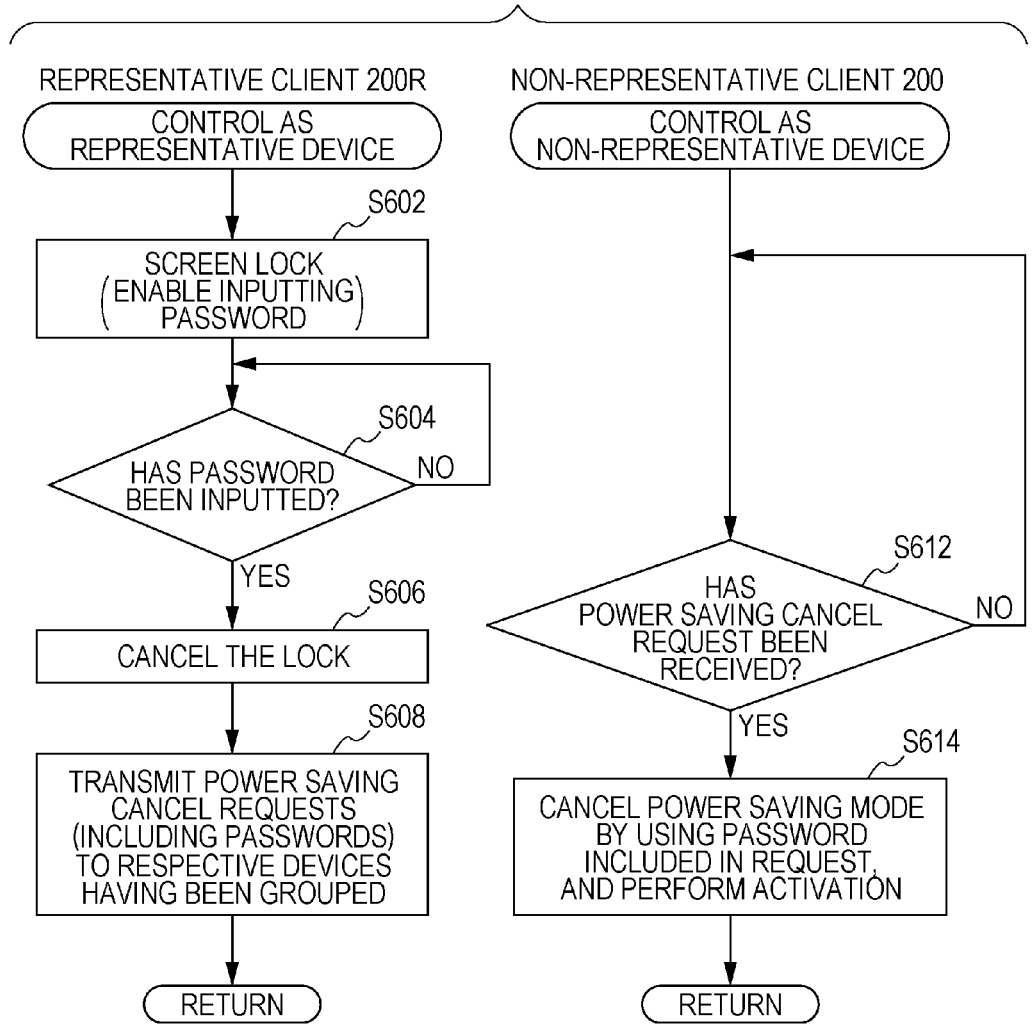
FIG. 13 is a flowchart illustrating a flow of synchronized power saving control processing performed by a non-representative device after the non-representative device has moved to a power saving mode, according to the second example of the invention.

FIG. 13 is a flowchart illustrating a flow of synchronized power saving control processing after the non-representative device has moved to a power saving mode. In the left area of FIG. 13, the content of processing performed by the representative client 200R is shown, and in the right area of FIG. 13, the content of processing performed by the non-representative client 200R is shown. In the power saving mode, the synchronization control section 213 of the non-representative client 200 monitors a receipt of a power saving cancel request (described below) from the representative client 200R (step S612). The synchronization control section 213 of the representative client 200R performs a screen lock (for example, displaying a screen saver) on the display 271 (step S602), and monitors inputting of a password via the keyboard 272 (step S604). If the synchronization control section 213 of the representative client 200R has received the inputted password (YES in step S604), the synchronization control section 213 releases the screen lock (step S606), and transmits a power saving cancel request together with the password to each of the non-representative clients 200 within a group (step S608). Upon receipt of the power saving cancel request and the password, each of the non-representative clients 200 cancels the power saving mode by using the password, and is activated (step S614).

As described above, in the same manner as or in a manner similar to that in the first example, the clients 200 having predetermined items common thereto in terms of device usage are grouped among the clients 200 within the network system 10a of the second example, and one of the clients 200 having been grouped is selected as the representative client 200R. Each of the non-representative clients 200 among the clients 200 having been grouped moves to the power saving mode when having received a power saving permission from the server 100, which is issued synchronously, while operating in the normal mode, and moves to the normal mode when having received a power saving cancel request from the representative client 200R, which is issued synchronously, while operating in the power saving mode. That is, each of the non-representative clients 200 performs a mode switching operation for switching between the normal mode and the power saving mode synchronously. In contrast, even after the non-representative clients 200 have moved to the power saving mode, the representative client 200R does not move to the power saving mode. That is, the representative client 200R performs a mode switching operation independently of mode switching operations performed by the non-representative clients 200. Thus, in the network system 10a of the second example, it is possible to suppress each of the non-representative clients 200 having been grouped from moving to the power saving mode independently, and it is possible for users to perform works by using the representative client 200R even after the non-representative clients 200 among the clients 200 having been grouped have moved to the power saving mode. Thus, in the network system 10a of the second example as well, similarly to the first example, it is possible to increase user convenience.

Further, in the network system 10a of the second example, upon acquisition of a password necessary for performing a mode switching operation for switching from the power saving mode to the normal mode, the representative client 200R transmits the acquired password to each of the non-representative clients 200, which performs a mode switching operation for switching from the power saving mode to the normal mode by using the password having been transmitted from the representative client 200R. Therefore, each of the clients 200 can be allowed to move to the normal mode without a password being inputted by the user to each of the clients 200 forming a group. Therefore, in the network system 10a of the second example, it is possible to further increase user convenience.

C. Third Example

Figure 14:
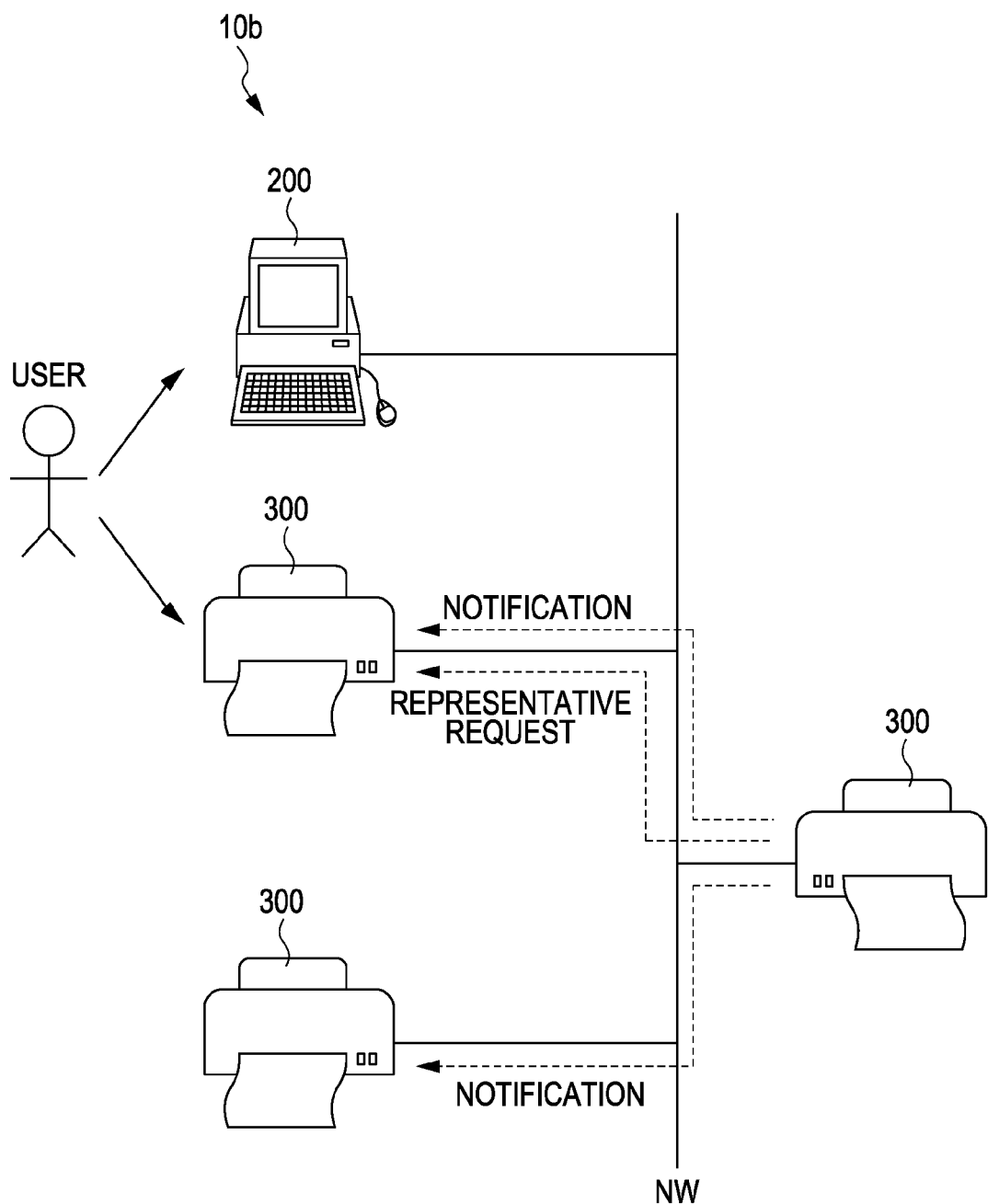
FIG. 14 is an explanatory diagram illustrating a configuration of a network system according to a third example of the invention.

FIG. 14 is an explanatory diagram illustrating a configuration of a network system 10b in a third example. A difference between the network system 10b in the third example and the network system 10 in the first example shown in FIG. 1 is that the network system 10b does not include the server 100. That is, the network system 10b of the third example includes a client 200 and a plurality of printers 300. In the third example, the printer 300 realizes functions of the server 100 in the first example. Specifically, in the third example, grouping processing and synchronized power saving control processing targeted for the printers 300 are performed under the control performed by not the server 100 but the printer 300 itself. Therefore, in the third example, the synchronized power saving control section 313 (FIG. 3) of the printer 300 realizes functions of the grouping processing section 112 and the representative selection section 114 of the server 100 (FIG. 2) in the first example as well.

Figure 15:
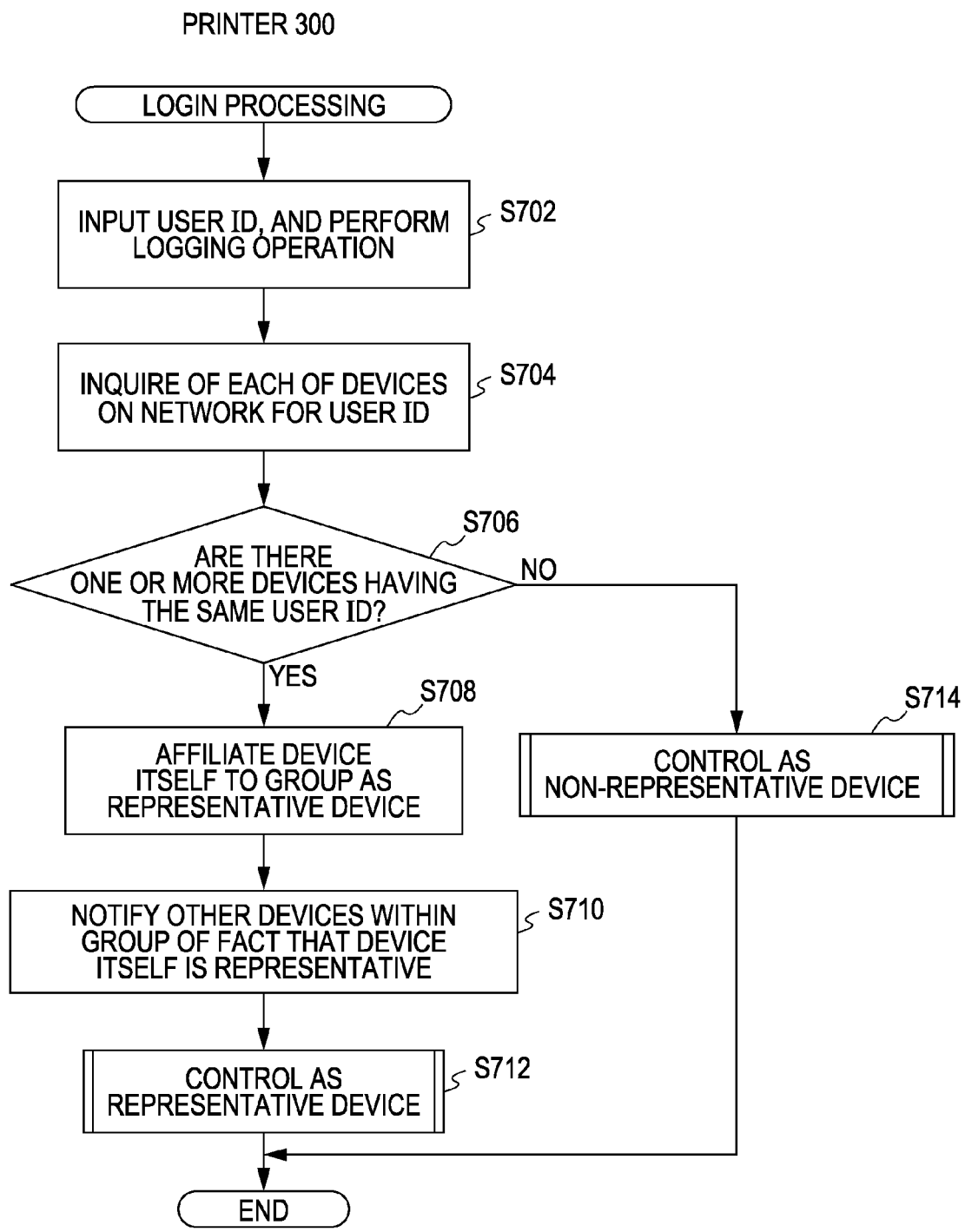
FIG. 15 is a flowchart illustrating login processing performed by a printer, according to the third example of the invention.

FIG. 15 is a flowchart illustrating a flow of login processing performed by the printer 300 in the third example. When a user inputs a user ID by inserting an ID card into the ID card reader 374 of the printer 300, the printer 300 logs in on the network NW (step S702). The synchronization control section 313 of the printer 300 inquires of the other printers 300 on the network NW for respective user IDs (step S704). As a result of the inquiry, if it is determined that none of the other printers 300 existing on the network NW has the same user ID, (NO in step S706), the synchronization control section 313 of the printer 300 performs control as one of non-representative printers 300 (step S714), which will be described below.

In contract, as a result of the inquiry, if it is determined that one or more of the other printers 300 existing on the network NW have the same user ID, (YES in step S706), the synchronization control section 313 of the printer 300 affiliates itself with a group as a representative device (step S708), and notifies the other printers 300 within the group of a fact that the printer 300 itself is the representative printer 300R (step S710). Subsequently, the synchronization control section 313 of the printer 300 performs control as the representative printer 300R, which will be described below (step S712).

Figure 16:
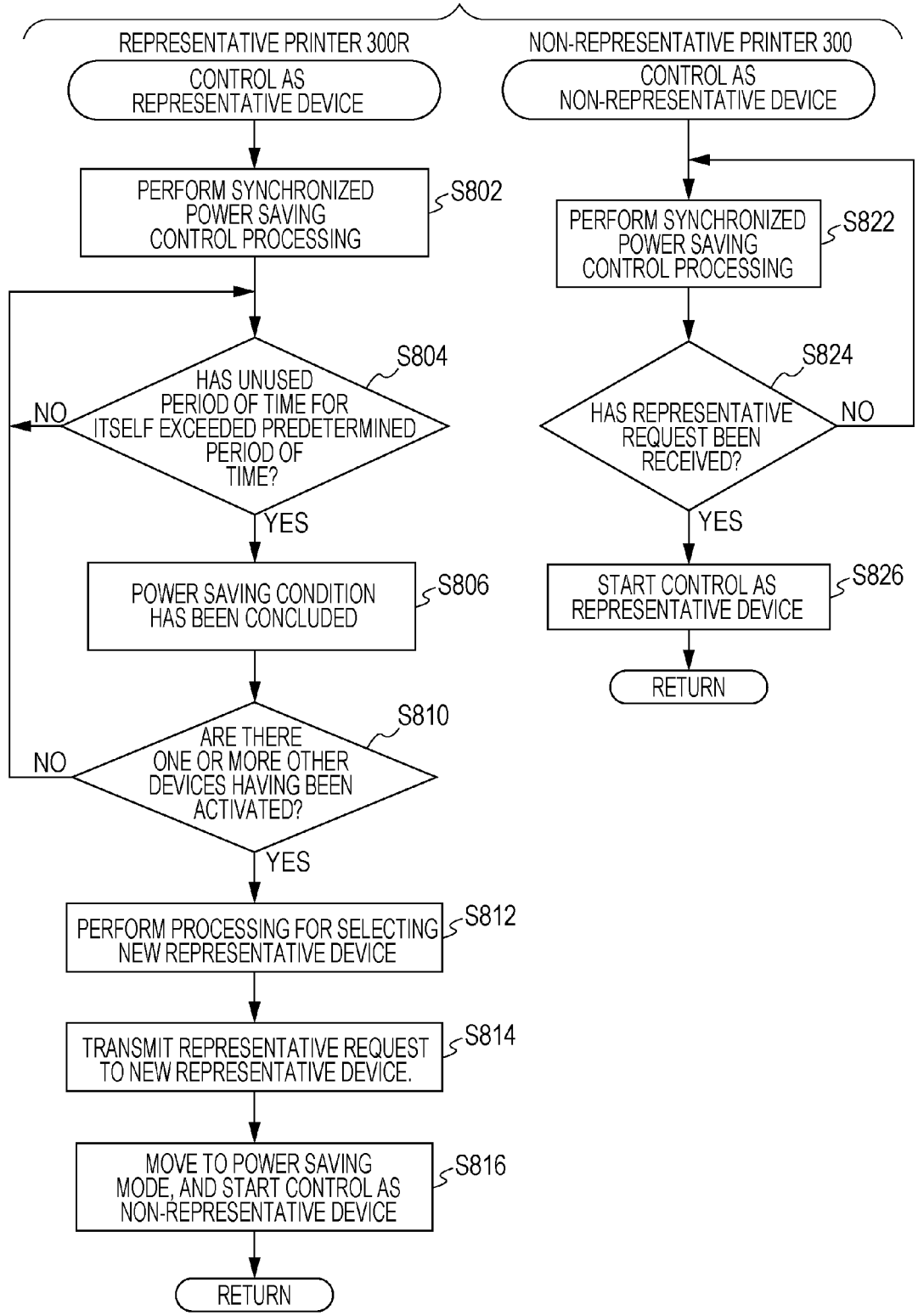
FIG. 16 is a flowchart illustrating a flow of synchronized power saving control processing according to the third example of the invention.

FIG. 16 is a flowchart illustrating a flow of synchronized power saving control processing in the third example. In the right area of FIG. 16, processing performed by the non-representative printer 300 is shown, and in the left area of FIG. 16, processing performed by the representative printer 300R is shown. The non-representative printer 300 performs processing the same as or similar to the processing performed by the printer 300 in the synchronized power saving control processing of the first example, such as shown in FIG. 8 (step S822). In contrast, the representative printer 300R performs processing the same as or similar to the processing performed by the server 100 in the synchronized power saving control processing of the first example, such as shown in FIG. 8 (step S802). That is, upon conclusion of a power saving condition, the synchronization control section 313 of the non-representative printer 300 issues a power saving request to the representative printer 300R. The synchronization control section 313 of the representative printer 300R receives the power saving request from each of the non-representative printers 300, and when the power saving requests from all the non-representative printers 300 within the group have been received, the synchronization control section 313 transmits a power saving permission to each of the non-representative printers 300. Note that, selecting a representative device is not performed at this time. Upon receipt of the power saving permission, the synchronization control section 313 of each of the non-representative printers 300 performs a mode switching operation for moving to the power saving mode.

The synchronization control section 313 of the representative printer 300R monitors whether an unused period of time relating to itself has exceeded a predetermined period of time (a threshold value), or not (step S804), and if the unused period of time has exceeded the predetermined period of time (YES in step S804), the synchronization control section 313 determines that a power saving condition has been concluded (step S806), and determines whether one or more of the other printers 300 within the group have been already activated, or not (step S810). If none of the other printers 300 has been activated (NO in step S810), the process flow returns to monitoring of an unused period of time (step S804). If one or more of the other printers 300 within the network have been already activated, (YES in step S810), the synchronization control section 313 of the representative printer 300R selects a new representative printer 300R (step S812). A method for selecting the new representative printer 300R is the same as or similar to that of the first example (FIG. 9). After the synchronization control section 313 has transmitted a representative request to the new representative printer 300R having been selected (step S814), the representative printer 300R moves to the power saving mode and starts control as the non-representative printer 300 (step S816).

The synchronization control section 313 of the non-representative printer 300 monitors a receipt of a representative request from the representative printer 300R (step S824). Upon receipt of the representative request from the representative printer 300R, the synchronization control section 313 starts control as the representative printer 300R (step S826).

As described above, in the network system 10b of the third example as well, in the same manner as or in a manner similar to that in the first example, the printers 300 having predetermined items common thereto in terms of device usage are grouped among the printers 300 existing within the network system 10b, and one of the printers 300 having been grouped functions as the representative printer 300R. Each of the non-representative printers 300 among the printers 300 having been grouped moves to the power saving mode when having received a power saving permission from the representative printer 300R, which is issued synchronously, while operating in the normal mode, and moves to the normal mode when having received a power saving cancel request from the representative printer 300R, which is issued synchronously, while operating in the power saving mode. That is, each of the non-representative printers 300 performs a mode switching operation for switching between the normal mode and the power saving mode synchronously. In contrast, even after the non-representative printers 300 have moved to the power saving mode, the representative printer 300R continues operations in the normal mode. That is, the representative printer 300R performs a mode switching operation independently of mode switching operations performed by the non-representative printers 300. Therefore, in the network system 10b of the third example as well, it is possible to suppress each of the non-representative printers 300 having been grouped from moving to the power saving mode independently, and it is possible for users to perform printing by using the representative printer 300R that continues operations in the normal mode even after the non-representative printers 300 among the printers 300 having been grouped have moved to the power saving mode. Thus, in the network system 10b of the third example as well, similarly to the first example, it is possible to increase user convenience.

D. Modified Examples

The invention is not limited to the above-described examples and embodiments, but can be applied in various aspects within the scope not departing from the gist of the invention, and, for example, can be applied in the following modifications as well.

D1. Modified Example 1

In each of the above-described examples, a device having the longest warm-up time is selected as a representative device from among devices forming a group, but it is possible to employ different methods as those for selecting a representative device. For example, among devices forming a group, a device that has moved latest to the power saving mode may be selected as a representative device. By employing such a method, when using a representative device after non-representative devices have moved to the power saving mode, it is possible to shorten a period of time necessary for starting operations (for example, a warm-up time), and thus, it is possible to improve efficiency of processing performed by the representative device. Note that, a plurality of devices having been grouped may have different periods of time taken from the time when having received the power saving permission until completion of moving to power saving mode, or some of the devices may be delayed in moving to the power saving mode owing to processing in progress when having received the power saving permission. Therefore, the times at which respective mode switching operations of switching from a normal mode to a power saving mode are performed may be different from one another.

Further, a representative device may be selected from among devices forming a group so that a frequency of being selected as the representative device can be averaged for each of the devices. By employing such a method, devices forming a group are equally consumed and wear.

D2. Modified Example 2

In each of the above-described examples, one of the devices forming a group is selected as a representative device, but a plurality of devices may be selected as representative devices.

D3. Modified Example 3

In each of the above-described examples, grouping of the same kind of devices, such as the grouping of a plurality of printers 300 or the grouping of a plurality of clients 200, has been made, but the invention can be applied in general to grouping of a plurality of devices including different kinds of devices. That is, in the network system 10, one or more clients 200 and one or more printers 300 may be grouped into one group.

Further, in each of the above-described examples, devices included in the network system 10 are the client 200 and/or the printer 300, but different kinds of devices may be included in the network system 10. That is, the invention can be applied to a network system including network-connectable kinds of devices other than the client 200 and the printer 300, such as scanners, projectors and facsimile machines.

D4. Modified Example 4

In each of the above-described examples, predetermined items in terms of device usage, which are used for grouping of devices, are a user (an operator), a login time (a usage time) and a login place (a usage place), but other items in terms of device usage may be used for grouping of devices.

Further, regarding determination of "the same login place", whether login places are the same or not may be determined on the basis of information relating to places detected using GPS functions. Such information is provided by users carrying GPS terminals or by causing devices to have GPS functions. Further, regarding determination of "the same login place", whether login places are the same or not may be determined by installing access points for a wireless LAN in offices, conference rooms or the like and specifying an access point where each user has logged in.

D5. Modified Example 5

The respective configurations of the network system 10, the server 100, the client 200 and the printer 300 in the above-described examples are examples, and can be variously modified. Further, part of components realized by hardware in each of the above-described examples may be implemented by software, and conversely, part of components realized by software may be implemented by hardware.

In the case where part or the whole of the functions according to some aspects of the invention is realized by software, the software (computer programs) can be stored in computer-readable recording media. In the some aspects of the invention, "the computer-readable recording media" include not only a portable recording medium, such as a flexible disc and a CD-ROM, but also an internal storage device inside a computer, such as various types of RAMs and ROMs, and an external storage device that is fixedly mounted to a computer, such as a hard disc.

The entire disclosure of Japanese Patent Application No. 2010-014185, filed Jan. 26, 2010 is expressly incorporated by reference herein.

What is claimed is:

1. A network system including a plurality of devices connected to one another via a network, the network system comprising:
    a grouping processing section configured to, from among the plurality of devices, perform grouping of devices having at least one predetermined item common thereto in terms of device usage;
    a representative selection section configured to select one of the devices having been grouped as a representative device; and
    a control section configured to cause non-representative devices, which are remaining devices resulting from excluding the representative device from the devices having been grouped, to perform synchronously a mode switching operation for switching between a normal mode and a power saving mode in which an amount of power consumption is smaller than that in the normal mode and cause the representative device to perform the mode switching operation independently of the mode switching operation performed by the non-representative devices.

2. The network system according to claim 1,
    wherein the representative selection section selects as the representative device a device for which a period of time taken from a time, at which the mode switching operation for switching from the power saving mode to the normal mode is performed, to the start of a predetermined operation is the longest of the devices having been grouped.

3. The network system according to claim 1,
    wherein the representative selection section selects a device, which has moved latest to the power saving mode among the devices having been grouped, as the representative device.

4. The network system according to claim 1,
    wherein the representative selection section selects the representative device so that, among the devices having been grouped, a frequency of being selected as the representative device can be averaged for each of the devices having been grouped.

5. The network system according to claim 1,
    wherein the control section causes the representative device to operate in the normal mode during a period of time the non-representative devices is in the power saving mode.

6. The network system according to claim 1,
    wherein the devices having been grouped are printing apparatuses, and
    wherein, once a printing job is inputted to one of the non-representative devices, the representative device acquires the printing job from the non-representative device, and performs one of operations of executing the printing job and retaining the printing job until completion of switching of the non-representative devices to the normal mode.

7. The network system according to claim 1,
    wherein the devices having been grouped are computers,
    wherein upon acquisition of a password for the mode switching operation for switching from the power saving mode to the normal mode, the representative device transmits the password to the non-representative devices, and wherein the non-representative devices perform the mode switching operation for switching from the power saving mode to the normal mode by using the password having been transmitted thereto.

8. The network system according to claim 1, wherein the predetermined item in terms of device usage is at least one of a user, a usage place, a usage time, and an attribute of a user.

9. The network system according to claim 1, wherein the grouping processing section, the representative selection section, and the control section are included in the devices having been grouped.

10. A method for controlling a network system including a plurality of devices connected to one another via a network including a plurality of devices connected to one another via a network using a processor configured to execute computer instructions to cause a system to perform a series of operations, the method comprising:

grouping devices having at least one predetermined item common thereto in terms of device usage, from among the plurality of devices;

selecting one of the devices having been grouped as a representative device; and causing non-representative devices, which are remaining devices resulting from excluding the representative device from the devices having been grouped, to perform synchronously a mode switching operation for switching between a normal mode and a power saving mode in which an amount of power consumption is smaller than that in the normal mode, and causing the representative device to perform the mode switching operation independently of the mode switching operation performed by the non-representative devices.

11. A computer program for controlling a network system including a plurality of devices connected to one another via a network, the computer program causing a computer to realize functions comprising:

grouping devices having at least one predetermined item common thereto in terms of device usage, from among the plurality of devices;

selecting one of the devices having been grouped as a representative device; and causing non-representative devices, which are remaining devices resulting from excluding the representative device from the devices having been grouped, to perform synchronously a mode switching operation for switching between a normal mode and a power saving mod, in which an amount of power consumption is smaller than that in the normal mode, and causing the representative device to perform the mode switching operation independently of the mode switching operation performed by the non-representative devices.

* * * * *